United States Patent [19]

Yuill

[11] Patent Number: 4,551,312
[45] Date of Patent: Nov. 5, 1985

[54] PROCESS FOR CONVERTING MOLYBDENITE TO MOLYBDENUM OXIDE

[75] Inventor: William A. Yuill, Tucson, Ariz.

[73] Assignee: Atlantic Richfield Company, Los Angeles, Calif.

[21] Appl. No.: 670,244

[22] Filed: Nov. 13, 1984

[51] Int. Cl.$^4$ ............................................. C01G 39/02
[52] U.S. Cl. .................................... 423/53; 423/59; 423/606
[58] Field of Search ........................... 423/53, 59, 606

[56] References Cited

U.S. PATENT DOCUMENTS

| | | | |
|---|---|---|---|
| 1,118,150 | 11/1914 | Robertson | 423/59 |
| 1,426,602 | 8/1922 | Robertson | 423/59 |
| 1,629,004 | 5/1927 | Schwarzkoff | 423/59 |
| 3,139,326 | 6/1964 | Costello | 423/59 |
| 3,336,100 | 8/1967 | Cloppet | 423/606 |
| 3,761,565 | 9/1973 | Arrizaga | 423/59 |
| 3,833,352 | 9/1974 | Vojkovic | 423/606 |
| 3,848,050 | 11/1974 | Jamal | 423/59 |
| 4,462,822 | 7/1984 | Sabocky et al. | 423/606 |

FOREIGN PATENT DOCUMENTS 588188  1/1978  U.S.S.R. ............................. 423/606

Primary Examiner—H. T. Carter
Attorney, Agent, or Firm—F. Lindsey Scott

[57] ABSTRACT

A process for converting molybdenite to molybdenum oxide by a flash roasting process wherein the molybdenum calcine produced in the flash roasting process is subsequently treated with a free chlorine-containing aqueous solution.

8 Claims, 2 Drawing Figures

PROCESS FOR CONVERTING MOLYBDENITE TO MOLYBDENUM OXIDE

This invention relates to a process for converting molybdenite to molybdenum oxide by a flash roasting process wherein the molybdenum calcine produced in the flash roasting process is subsequently treated with a free chlorine-containing aqueous solution.

In many naturally occurring ore bodies containing molybdenum the molybdenum is found in the form of molybdenite, i.e., molybdenum sulfide. Since molybdenum sulfide is readily separated from gangues and other materials associated with the molybdenum sulfide by conventional ore concentration processes, most processes for the production of molybdenum oxide use molybdenite as a starting material.

In many applications, molybdenum is useful in its oxide form. Unfortunately, in many such applications it is necessary that the molybdenum oxide be relatively pure, i.e., contain relatively small quantities of sulfur, copper and other metals. In order to meet the purity requirements, a variety of processes have been used. In one commonly used process for producing molybdenum oxide containing small amounts of sulfur, copper and other metals, a preliminary treatment of the molybdenite concentrates with ferric chloride has been used. The ferric chloride solution is used to leach metals such as copper, lead, iron and the like from the molybdenite concentrates. After separation from the ferric chloride leach solution and neutralization as required, the molybdenite is then passed to roasters to oxidize the molybdenite to molybdenum oxide. Equipment such as multiple hearth roasters are commonly used for such roasting. Equipment such as multiple hearth roasters is well known to those skilled in the art as shown in the *Chemical Engineers Handbook*, Robert H. Perry, McGraw Hill Book Company, Fifth Edition, 1973, pages 20–49.

Long residence times at elevated temperatures with variable oxygen-containing gas flows are used in such multiple hearth roasters to reduce the sulfur content of the resulting molybdenum oxide to less than about 0.1 wt. percent as required for technical grade molybdenum oxide.

Such processes have been effective to produce technical grade molybdenum oxide. Unfortunately, such processes involve very expensive equipment, i.e., multiple hearth roasters. Such roasters are relatively large as a result of the long residence time and high temperatures required in such roasters to produce technical grade molybdenum oxide and such roasters produce large amounts of exhaust gas containing relatively low concentrations of sulfur oxides (typically in the range of about 3 to about 4 volume percent $SO_2$) which must be treated both for environmental reasons and to recover the sulfur contained in the exhaust gas. The recovery of sulfur oxides from such large streams with a relatively low sulfur content also requires relatively large equipment and comprises an additional major capital cost and operating expense when roasters are used. Further, the use of the preliminary ferric chloride leach solution is also a relatively expensive operation. As a result, a continuing effort has been directed to the development of more economical methods for producing technical grade molybdenum oxide.

As well known to those skilled in the art, very high purity molybdenum oxide has also been produced by sublimation processes. Such processes basically vaporize the molybdenum oxide for subsequent condensation and recovery in particulate form to produce very high purity molybdenum oxide.

In the preparation of the present application, U.S. Pat. Nos. 1,118,150; 1,426,602; 3,139,326; 3,761,565; and 3,848,050 were considered. These patents are hereby incorporated in their entirety by reference.

According to the present invention, it has been found that technical grade molybdenum oxide is readily produced by a process comprising:

(a) Flash roasting molybdenite in a flash roasting zone to produce a molybdenum calcine comprising molybdenum oxide and minor quantities of residual sulfur;

(b) Intimately contacting the molybdenum calcine with a free chlorine-containing aqueous solution for a time in excess of 2 hours to remove at least a major portion of the residual sulfur from said molybdenum calcine; and, (c) Separating the aqueous solution from the molybdenum oxide.

In the description of the Figures, the same numbers will be used to refer to the same or similar components throughout.

Figure 1:
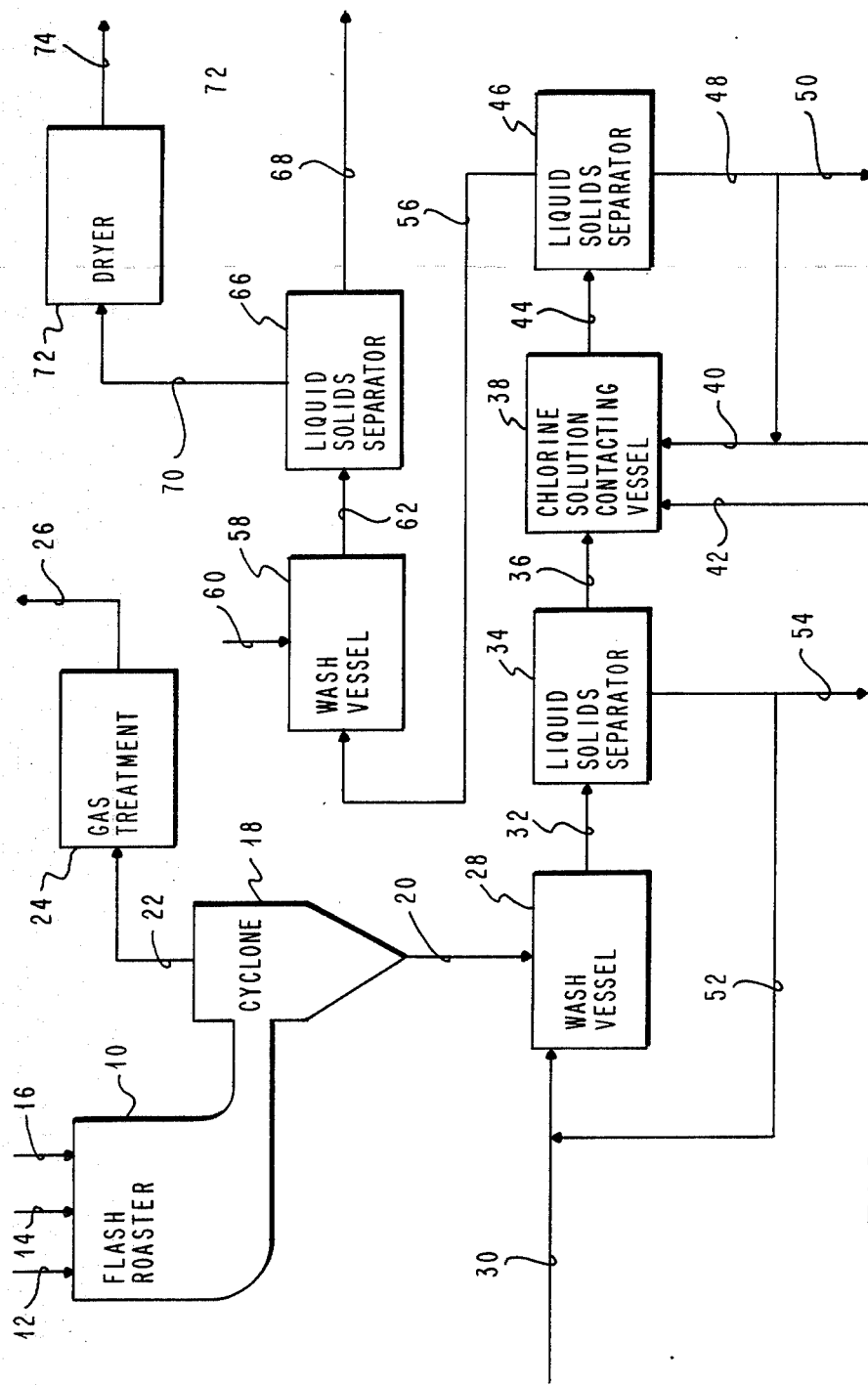
FIG. 1 is a schematic diagram of an embodiment of the present invention.

In FIG. 1, a flash roaster 10 is shown. Molybdenite concentrates are charged to flash roaster 10 through a line 12 with air being charged to flash roaster 10 through a line 14 and a suitable fuel such as natural gas being fed to flash roaster 10 through a line 16. Molybdenite is oxidized in flash roaster 10 as known to those skilled in the art to produce a molybdenum calcine which comprises primarily molybdenum oxide ($MoO_3$). Such molybdenum calcines will normally contain minor quantities of residual sulfur. As well known to those skilled in the art, quantities of residual sulfur greater than about 0.1 wt. percent are unsuitable in molybdenum oxide products which are to be used in certain applications. Technical grade molybdenum oxide is generally limited to sulfur contents below about 0.1 wt. percent by specification.

Figure 2:
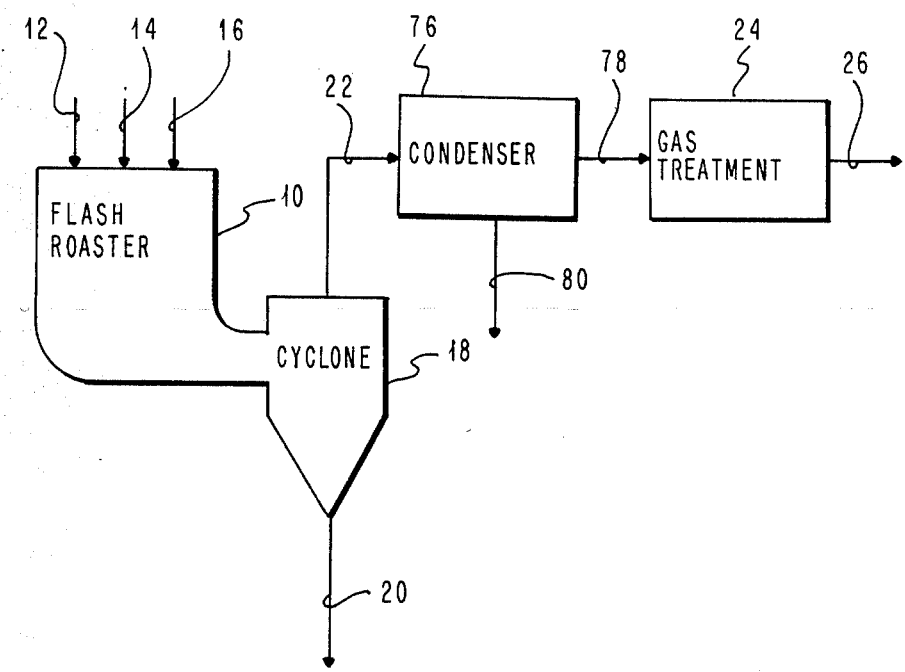
FIG. 2 is a schematic diagram of a variation of a flash roaster suitable for use in the present invention.

Flash roaster 10 may be operated at temperatures greater than about 500° C. When flash roaster 10 is operated at a temperature from about 500° to 1000° C., the molybdenum oxide is normally recovered as fine particulates which generally retain the same size and shape as the original particulate molybdenite charged to flash roaster 10. This embodiment is shown in FIG. 1. Alternatively, when flash roaster 10 is operated at temperatures above about 1100° to 1150° C., most of the molybdenum oxide is vaporized or sublimed and then recondensed for molybdenum oxide recovery as a finely divided particulate solids. The molybdenum oxide recovered as a condensate is high purity molybdenum oxide. The configuration of flash roaster 10 is substantially the same in each instance although a molybdenum oxide recovery section is normally required after the initial solids separation section to condense and recover the molybdenum oxide when the molybdenum oxide is recovered from flash roaster 10 as a condensate. Such a variation is shown is FIG. 2 as will be discussed hereinafter.

In FIG. 1, the product stream from flash roaster 10 which includes finely-divided particulate molybdenum oxide, gangues, exhaust gases, sulfur oxides and the like is passed to a cyclone 18 or other suitable gas-solids separation equipment where a particulate solid stream is recovered through a line 20 as the cyclone underflow with a gaseous stream containing sulfur dioxides and exhaust gas products being recovered through a line 22. The exhaust gas recovered through line 22 is passed to a gas treatment section 24 where sulfur oxides may be removed for recovery as acid values and the gas may be further processed to produce an exhaust gas stream which may be discharged to the atmosphere through a line 26. As known to those skilled in the art, other valuable constituents, if present, maybe recovered from the exhaust gas stream as well. For instance, the finely divided particles recovered as dust from the exhaust gas may contain substantial quantities of mineral values and are desirably recycled or passed to other processing as appropriate for the recovery of such values.

The molybdenum calcine recovered through line 20 as shown in FIG. 1 is passed to a wash vessel 28 where it is intimately contacted for a suitable period of time with a dilute aqueous sulfuric acid solution (line 30) to remove soluble metal compounds from the molybdenum calcine. Such compounds may comprise copper sulfates, iron sulfates and the like. Such metals which have been recovered with the molybdenite concentrate and passed through flash roaster 10 may have been rendered soluble in flash roaster 10 and subject to recovery by an aqueous acid washing step at this point. Since the quantity of other metals present in molybdenum oxide is often fixed by specification for various product grades of molybdenum oxide, it is highly desirable that such other metals be removed if convenient. The use of aqueous acid for the removal of such soluble metal compounds from solids is known to those skilled in the art and may be conducted at any suitable acid strength for any suitable length of time for the effective removal of such soluble metal compounds from the molybdenum calcine. Typically, acid strengths in vessel 28 will be no more than about 5 to 10 grams per liter. Desirably the acid strength and metal concentration are kept relatively low in vessel 28 to minimize the amounts of acid and metal transferred to vessel 38. The resulting products stream from wash vessel 28 is recovered through a line 32 and passed to a liquid/solids separator 34 where the products stream is separated into a molybdenum calcine residue solids stream containing minor amounts of water recovered through a line 36 and an aqueous acid stream recovered through a line 52 for recycle back to wash vessel 28. As the process is continued and additional quantities of soluble metal values are accumulated in the aqueous stream in line 52, it will be desirable to remove such metal values by a bleed stream 54. In the practice of the present process, it may also be desirable to use an additional washing step (not shown) to insure substantially complete removal of the acid constituents from the molybdenum calcine passed through line 36 to a chlorine solution contacting vessel 38. In vessel 38, the molybdenum oxide calcine is contacted with an aqueous solution containing free chlorine. The aqueous solution containing free chlorine can be introduced through a line 40 as shown or formed in situ by bubbling chlorine into an aqueous solution in vessel 38 or otherwise injecting gaseous chlorine into vessel 38 through a line 42. Desirably, the amount of aqueous solution used in vessel 38 is sufficient to result in a slurry mixture containing from about 30 to about 50 wt. percent solids. The concentration of chlorine in the aqueous solution is not considered to be critical and desirably the chlorine content of the aqueous solution is maintained by maintaining a chlorine atmosphere in vessel 38. After a suitable reaction time in vessel 38, i.e., at least about 2 hours, the resulting product stream is withdrawn via a line 44 and passed through a liquid/solids separator 46. In liquid/solids separator 46, an aqueous stream is withdrawn through a line 48 and desirably recycled back to vessel 38 through a line 48. This stream will frequently contain substantial quantities of dissolved molybdenum and it is highly desirable that it be recycled. As a result of the dissolution of sulfur and certain metal compounds from the molybdenum oxide calcine in vessel 38, it is to be expected that various mineral values such as copper, iron and the like may accumulate in the aqueous stream recovered through line 48. To control the concentration of such dissolved metals to a suitable limit, a bleed stream is withdrawn as required through a line 50. The stream withdrawn through line 50 may be passed to further processing, to combination with the stream recovered through line 54 or the like as known to those skilled in the art.

The molybdenum oxide calcine recovered from liquid/solids separator 46 is passed through a line 56 to a wash vessel 58 where it is contacted with water to reduce the amounts of aqueous solution from vessel 38 associated with the molybdenum oxide calcine. The washed molybdenum oxide calcine which has a greatly reduced sulfur content and a reduced metal content is passed to a liquid/solids separator 66 from which an aqueous stream is recovered through a line 68 with the washed calcine being recovered through a line 70. The aqueous stream recovered through line 68 is desirably used for makeup in either vessel 38 or vessel 28. This stream will frequently contain minor quantities of other metals and chlorine and in some instances small amounts of molybdenum. The small amounts of dissolved metals contained in this solution normally will not warrant separate treatment for the recovery of the mineral values but if convenient it is desirable that this stream be used as a liquid makeup stream. The molybdenum oxide calcine recovered through line 70 is passed to a dryer 72 where it is dried by any suitable means to produce a molybdenum oxide product of a high purity. The dried product is recovered through a line 74.

By the practice of the process of the present invention, it has been found that technical grade molybdenum oxide is readily produced without subsequent treatment. The use of a flash roaster as the initial step in the process accomplishes the initial oxidation of the molybdenum in a very effective and efficient manner using equipment which is relatively inexpensive. Because of the short residence times in the flash roaster, i.e., typically less than about 5 seconds and frequently from about 0.5 to about 2 seconds, much smaller equipment is used and much more concentrated sulfur dioxide-containing exhaust gas streams, i.e., frequently in the general range from about 10 to about 12 volume percent $SO_2$, result from the roasting process than when expensive long residence time equipment such as multiple hearth reactors are used. As discussed previously, such multiple hearth reactors tend to be large relative to the product throughput and relatively expensive. Further, since such equipment is relatively complex from a mechanical point of view, considerable maintenance is required. Particularly when it is desired to produce molybdenum oxide having a very low sulfur content, long residence times at high temperatures are required in multiple hearth roasters in order to reduce the last traces of residual sulfur to a suitable level. Applicant has overcome these disadvantages by the use of a flash roaster in conjunction with the chlorine contacting step. More specifically, while the flash roasting process does not normally reduce the residual sulfur in the molybdenum oxide calcine to a level suitable to meet product specifications for technical grade molybdenum oxide, it does achieve removal of a very high percentage of the sulfur initially present. In the chlorine contacting process, it has been found that residual sulfur and copper and in some instances other metals remaining with the molybdenum oxide after flash roasting are effectively and efficiently removed to produce technical grade molybdenum oxide efficiently and reliably. Previously, attempts have been made to remove all the sulfur from the molybdenite using chlorine as a contacting agent. Such processes have proven to be prohibitively expensive as a result of the chlorine reagent costs. However, by the use of the present process, the use of chlorine which is an effective agent for the removal of sulfur and copper from molybdenum oxide has been found to be very effective in combination with flash roasting to accomplish the production of a high purity molybdenum oxide effectively and economically. In other words, the use of the flash roasting process results in very economical removal of the bulk of the sulfur with only residual quantities of sulfur being left for removal in the chlorine contacting process. While the chlorine contacting step is an added process cost, the reagent cost for the chlorine contacting process is kept to a minimum as a result of the smaller amounts of chlorine required to remove the residual sulfur and copper while still accomplishing the desired purity. The use of the chlorine contacting step in conjunction with flash roasting results in the production of technical grade molybdenum oxide at a reduced cost, since large expensive long residence time roasting equipment is not required.

Further, in processes wherein multiple hearth reactors are used, frequently the molybdenite is contacted prior to roasting with material such as ferric chloride for the removal of other metal constituents from the molybdenite. Such a step is, of course, an added expense to the overall process and while it does result in the presence of smaller quantities of other metals in the resulting molybdenum oxide product, it does not remove substantial amounts of sulfur, but still comprises a substantial added expense to processes wherein molybdenum oxide is produced by the multiple hearth process. By contrast, in Applicant's claimed process, the use of the sulfuric acid wash prior to the chlorine contacting step selectively removes major quantities of other metals left in the molybdenum oxide calcine and sulfur and additional quantities of other metals, such as copper, are also removed from the molybdenum oxide in the chlorine contacting step A comparable grade of molybdenum oxide is thus readily produced by Applicant's claimed process without the use of ferric chloride leaching process and without the use of the expensive multiple hearth roaster furnaces.

In Applicant's claimed process, the residence time in vessel 28 is desirably from about 10 to about 40 minutes and desirably the molybdenum oxide calcine is vigorously agitated in contact with an aqueous sulfuric acid solution.

As discussed previously, the resulting wash solution in line 52 is desirably recycled until mineral values have accumulated to a level such that it is desirable to recover a bleed stream of the acid solution for minerals recovery or to reduce the concentration of the minerals in the wash solution to insure effective removal of other metals from the molybdenum oxide in vessel 28.

While reaction times of at least about 2 hours are suitable in vessel 38, reaction times of about 3 to about 8 hours are preferred and in many instances times from about 4 to about 8 hours are desirable. Desirably the aqueous solution in vessel 38 is vigorously agitated to insure effective contact between the aqueous solution and the molybdenum oxide.

As well known to those skilled in the art, various gangues may be associated with the molybdenite as charged to flash roaster 10. Such gangues are of course recovered with the molybdenum oxide calcine as the underflow from cyclone 18 through line 20. The gangue materials are generally present in sufficiently small quantities and are of a composition such that their presence is not detrimental to the production of molybdenum oxide of a technical grade.

To eliminate the gangues from the molybdenum oxide calcine in the event that a high quantity of gangues is present in the molybdenite charged to flash roaster 10 or if a higher grade molybdenum oxide is to be produced, flash roaster 10 may be operated at a temperature in excess of about 1000° C. and preferably in excess of about 1150° C. to vaporize the molybdenum oxide. By reference to FIG. 2, which shows an embodiment of the present invention wherein roaster 10 is operated to vaporize the molybdenum oxide, the roaster products are passed to cyclone 18. Gangues and other solid particulates are recovered from cyclone 18 through line 20 and passed to further processing for the recovery of metal values or discarded with the vaporous molybdenum oxide being recovered through line 22 and passed to a condenser 76. In condenser 76, the vaporous molybdenum oxide is condensed and recovered as finely divided particles which are recovered through a line 80 as a molybdenum oxide calcine. The resulting gaseous stream from which the molybdenum oxide has been recovered is passed through a line 78 to treatment as discussed previously in gas treatment section 24. The molybdenum oxide calcine recovered through line 80 is passed to subsequent processing in wash vessel 28 and the like as discussed previously.

Certain of the steps included in FIG. 1 may not be required in all instances. In the event that very low quantities of metals other than molybdenum are found in the molybdenum oxide calcine it may not be necessary to use the acid wash in vessel 28. Similarly, it may not be necessary in the event that low concentrations of other metals or sulfur-containing materials are present in line 48 to use the washing step shown in wash vessel 58. It is believed that such process control considerations are well within the skill of those in the art and need not be discussed further.

As well known to those skilled in the art, in the event that extremely high purity molybdenum oxide is desirable, it may be necessary to use further purification steps such as sublimation and the like with the resulting molybdenum oxide product. Such processes for further upgrading molybdenum oxide are considered to be well known to those skilled in the art and need not be discussed further.

EXAMPLE

A molybdenum sulfide concentrate was roasted in a muffle furnace (to simulate a flash roaster calcine) at 550° C. for 24 hours to reduce the sulfur content and produce molybdenum oxide. The resulting molybdenum oxide calcine was then treated as follows. Two hundred grams of the molybdenum oxide calcine was agitated in 0.4 liters of an aqueous acid solution containing 500 grams per liter of sulfuric acid for 15 minutes and thereafter the aqueous acid solution was drained from the molybdenum oxide calcine which was thereafter rinsed and filtered. The molybdenum oxide calcine was then mixed with 0.4 liters of solution purged with free chlorine at about 100 ml (stp) per minute at about 55° C. and agitated for 8 hours. An exothermic reaction took place with the immediate evolution of gas. The chlorine leach solution was decanted from the molybdenum oxide calcine and the solids were washed and dried. The results of this test are summarized in Table I.

TABLE I

| | Assays in Weight Percent | | | |
|---|---|---|---|---|
| | Cu | Fe | Mo | S |
| Roasted Product | 0.65 | 0.71 | 62.1 | 1.58 |
| Residue After Sulfuric Acid Leach | 0.09[b] | 0.53[b] | 64.7[b] | 1.20[b] |
| Residue After Chlorine Leach | 0.008 | 0.067 | 65.9 | 0.008 |

[b]calculated from acid wash solution

It is clear that not only has the residual sulfur content been substantially reduced but that the amounts of copper and iron in the molybdenum oxide calcine have also been substantially reduced.

Having discussed the present invention by reference to certain of its preferred embodiments, it is respectfully pointed out that the embodiments described are illustrative rather than limiting in nature and that many variations and modifications are possible within the scope of the present invention. Many such variations and modifications may appear obvious and desirable to those skilled in the art based upon the foregoing description of preferred embodiments.

Having thus described the invention, I claim:

1. A process for converting molybdenite to molybdenum oxide, said process comprising;
   (a) flash roasting said molybdenite in a flash roasting zone to produce a molybdenum calcine comprising molybdenum oxide and minor quantities of residual sulfur;
   (b) intimately contacting said molybdenum calcine with a free chlorine-containing aqueous solution for a time in excess of about 2 hours to remove at least a major portion of said residual sulfur from said molybdenum calcine; and,
   (c) separating said aqueous solution from said molybdenum oxide.

2. The process of claim 1 wherein the temperature in said flash roasting zone is at least about 500° C.

3. The process of claim 2 wherein the residence time in said flash roasting zone is less than about 5 seconds.

4. The process of claim 2 wherein the temperature in said flash roasting zone is from about 500° to about 1100° C. and wherein said molybdenum calcine is recovered from said flash roasting zone as a finely divided solids stream.

5. The process of claim 2 wherein said temperature is above about 1100° C. and said molybdenum calcine is recovered from said flash roasting zone as a vaporous stream.

6. The process of claim 1 wherein said molybdenum calcine is contacted with said aqueous solution for at time from about 3 to about 8 hours.

7. The process of claim 6 wherein the residual sulfur in said molybdenum oxide is less than about 0.1 wt. percent based upon the weight of said molybdenum oxide.

8. The process of claim 1 wherein said molybdenum calcine is washed with an aqueous solution of sulfuric acid to remove soluble metals or metal salts from said molybdenum calcine prior to contacting said molybdenum calcine with said free chlorine-containing aqueous solution.

* * * * *